United States Patent
Chang

(10) Patent No.: US 12,397,711 B2
(45) Date of Patent: Aug. 26, 2025

(54) DISPLAY METHOD AND DISPLAY SYSTEM OF ON-VEHICLE AVM, ELECTRONIC DEVICE, AND STORAGE MEDIUM

(71) Applicant: Spreadtrum Communications (Tianjin) Co., Ltd., Tianjin (CN)

(72) Inventor: Yujun Chang, Tianjin (CN)

(73) Assignee: Spreadtrum Communications (Tianjin) Co., Ltd., Tianjin (CN)

( * ) Notice: Subject to any disclaimer, the term of this patent is extended or adjusted under 35 U.S.C. 154(b) by 35 days.

(21) Appl. No.: 18/017,620

(22) PCT Filed: Jul. 26, 2021

(86) PCT No.: PCT/CN2021/108307
§ 371 (c)(1),
(2) Date: Aug. 8, 2023

(87) PCT Pub. No.: WO2022/017528
PCT Pub. Date: Jan. 27, 2022

(65) Prior Publication Data
US 2024/0208419 A1    Jun. 27, 2024

(30) Foreign Application Priority Data
Jul. 24, 2020   (CN) .......................... 202010722290.6

(51) Int. Cl.
*B60R 1/27* (2022.01)
*G06T 3/4038* (2024.01)
*G06T 19/00* (2011.01)

(52) U.S. Cl.
CPC .............. *B60R 1/27* (2022.01); *G06T 3/4038* (2013.01); *G06T 19/006* (2013.01); *B60R 2300/105* (2013.01); *B60R 2300/303* (2013.01)

(58) Field of Classification Search
CPC ...... H04N 7/181; H04N 23/698; H04N 23/90; H04N 13/111; H04N 23/56; H04N 23/661;
(Continued)

(56) References Cited

U.S. PATENT DOCUMENTS

2017/0324943 A1*  11/2017  Wu ........................... B60R 1/27
2019/0100147 A1*  4/2019  Fang ..................... B60K 35/265

FOREIGN PATENT DOCUMENTS

CN       103136720 A       6/2013
CN       103617606 A       3/2014
(Continued)

OTHER PUBLICATIONS

International Search Report received in PCT Application No. PCT/CN2021/108307 dated Sep. 23, 2021.
(Continued)

*Primary Examiner* — Masum Billah
(74) *Attorney, Agent, or Firm* — Knobbe Martens Olson & Bear LLP

(57) ABSTRACT

A display method and a display system of an on-vehicle around view monitor (AVM), an electronic device, and a storage medium. The display method is performed based on on-vehicle lenses. The display method includes constructing a coordinate mapping table representing a coordinate mapping relationship between a panoramic image generated by splicing original images captured by the on-vehicle lenses and each original image captured by the on-vehicle lenses, generating the panoramic image based on the original images captured by the on-vehicle lenses and the coordinate mapping table, mapping the panoramic image to a preset world model to construct a virtual world inside the preset world model, disposing a vehicle model at a position corresponding to a real vehicle in the virtual world, and
(Continued)

rendering and outputting an image, corresponding to a specified view point, in the virtual world. The view point is located on the preset world model and faces towards a center of the vehicle model. The end-to-end coordinate mapping table constructed with the method can avoid multiple image interpolations, and the construction of the virtual world facilitates the realization of a real-time preview.

18 Claims, 10 Drawing Sheets

(58) Field of Classification Search
CPC .. H04N 5/2224; H04N 13/117; H04N 13/128; H04N 13/239; B60R 1/27; B60R 2300/105; B60R 2300/303; B60R 1/00; G06T 19/006; G06T 3/4038
USPC .......................................................... 348/837
See application file for complete search history.

(56) References Cited

FOREIGN PATENT DOCUMENTS

| CN | 103763517 | A | | 4/2014 | |
| CN | 105635551 | A | | 6/2016 | |
| CN | 106875339 | A | | 6/2017 | |
| CN | 106991640 | A | | 7/2017 | |
| CN | 107424120 | A | | 12/2017 | |
| CN | 108269235 | A | | 7/2018 | |
| CN | 109064391 | A | | 12/2018 | |
| CN | 106875339 | B | * | 3/2020 | ........... G06T 3/4038 |
| CN | 111731190 | A | | 10/2020 | |
| IN | 106710000 | A | | 5/2016 | |
| JP | 2011066860 | A | | 3/2011 | |
| KR | 101642975 | B1 | | 7/2016 | |

OTHER PUBLICATIONS

Office Action received in Chinese Application No. 202010722290.6 dated Aug. 1, 2022.
Notice of Allowance received in Chinese Application No. 202010722290.6 dated Dec. 7, 2022.
Office Action received in Chinese Application No. 22010722290.6 dated Aug. 1, 2022 in 14 pp.
Zhou et al. "Study on fisheye image correction based on cylinder model", Computer Application, vol. 28, No. 10, Oct. 2008, 3 pp.

* cited by examiner

DISPLAY METHOD AND DISPLAY SYSTEM OF ON-VEHICLE AVM, ELECTRONIC DEVICE, AND STORAGE MEDIUM

CROSS-REFERENCE TO RELATED APPLICATIONS

The present application is a national stage of International Application No. PCT/CN2021/108307, filed on Jul. 26, 2021, which claims priority to Chinese Patent Application No. 202010722290.6, filed on Jul. 24, 2020, the disclosures of which are incorporated herein by reference in their entirety.

TECHNICAL FIELD

The present disclosure relates to the technical field of image processing, and in particular to a display method and a display system of an on-vehicle around view monitor (AVM), an electronic device, and a storage medium.

BACKGROUND

An AVM three-dimensional (3D) reversing image can help a driver to observe the ambient conditions around the vehicle so as to avoid collision accidents. Compared with a two-dimensional (2D) panorama, a 3D panorama can achieve a larger field of vision and can switch view angles at will to observe the surrounding conditions around the vehicle. The 2D panorama generally covers a range of 1 meter to 3 meters from the vehicle, while the field of vision of 3D panorama can cover a range within 20 meters or more from the vehicle. The expansion of the field of vision indicates a larger range and a larger size of the image to be processed under the premise of not degrading the image quality, which will reduce the frame frequency.

In the current AVM 3D reversing image solution, image data are collected by multiple cameras mounted at different positions of the vehicle, and images captured by these cameras are combined into a 360-degree panoramic image. The generation of the 360-degree panoramic image needs to be calibrated with a calibration target. The images are spliced together through points on the calibration target, and then a more natural transition is performed on a splicing gap on the spliced image with the fusion algorithm.

After the above process, the 2D panoramic image is generated. In the existing AVM 3D reversing image solution, the 3D image under a certain view angle is calculated according to the view angle based on the 2D panoramic image. The view angle is a user input item, which can be changed by the user by sliding the screen. With each change of the view angle, an output image is recalculated. When the user quickly slides the screen to change the view angle, poor user experiences such as stuttering and image tearing will be caused due to the limit of the calculation speed. In addition, the generation of the 3D image requires a plurality of image interpolations, each of which will causes a decline in image quality.

SUMMARY

The present disclosure provides a display method and a display system of an on-vehicle AVM, an electronic device, and a storage medium, which solve the technical problem of multiple interpolations when generating AMV 3D reversing image in the related art, and solve the technical problem of calculating a 3D image under only one view angle every time.

The present disclosure solves the technical problems through the following technical solutions.

A display method of an on-vehicle AVM is performed based on a plurality of on-vehicle lenses, and includes: constructing a coordinate mapping table, the coordinate mapping table representing a coordinate mapping relationship between a panoramic image generated by splicing original images captured by the plurality of on-vehicle lenses and each of the original images captured by the plurality of on-vehicle lenses; generating the panoramic image based on the original images captured by the plurality of on-vehicle lenses and the coordinate mapping table; mapping the panoramic image to a preset world model in such a manner that a virtual world is constructed inside the preset world model; disposing a vehicle model at a position, corresponding to a real vehicle, in the virtual world; and rendering and outputting an image, corresponding to a specified view point, in the virtual world, the specified view point being located on the preset world model and facing towards a center of the vehicle model.

In some embodiments, the constructing the coordinate mapping table includes: splicing the original images captured by the plurality of on-vehicle lenses to obtain an initial panoramic image; determining an image outside a circular image with a center of the real vehicle as a center of a circle and a preset length as a radius in the initial panoramic image, as a to-be-compressed image; constructing a preset compression model including a center of a sphere; mapping the to-be-compressed image to the preset compression model by taking the center of the sphere as a view point; projecting, by pulling the view point to infinity, the to-be-compressed image mapped to the preset compression model, to a plane of the circular image to generate a compressed panoramic image; and constructing the coordinate mapping relationship based on the compressed panoramic image and the original images captured by the plurality of on-vehicle lenses. And the constructing the preset compression model includes: determining two first points of intersection of an auxiliary line and the initial panoramic image, the auxiliary line being parallel to a side of the initial panoramic image and passes through the center of the circle; determining a target point, a connecting line between the center of the circle and the target point being perpendicular to the initial panoramic image, and the target point forming a preset angle with each of the two first points of intersection; determining a target distance from the target point to a second point of intersection formed between the auxiliary line and the circular image; and determining a closed structure as the preset compression model, the closed structure being located at a side of the circular image facing towards the target point and being formed by a sphere with the target point as a center of sphere and the target distance as a radius.

In some embodiments, the splicing the original images captured by the plurality of on-vehicle lenses to obtain the initial panoramic image includes: cropping a region of interest (ROI) of each of the original images; performing projection transformation on the cropped ROIs of the original images to generate top views; and splicing the top views corresponding to the plurality of on-vehicle lenses to generate the initial panoramic image. In some embodiments, the preset world model is obtained by scaling the preset compression model.

In some embodiments, the on-vehicle lenses are fisheye lenses, and the constructing the coordinate mapping table includes performing distortion correction on the original images. In some embodiments, coordinate data have a double-precision floating-point format.

A display system for an on-vehicle AVM based on a plurality of on-vehicle lenses includes a construction module, a generation module, a mapping module, a disposing module, and a rendering and outputting module. The construction module is configured to construct a coordinate mapping table, the coordinate mapping table representing a coordinate mapping relationship between a panoramic image generated by splicing original images captured by the plurality of on-vehicle lenses and each of the original images captured by the plurality of on-vehicle lenses. The generation module is configured to generate the panoramic image based on the original images captured by the plurality of on-vehicle lenses and the coordinate mapping table. The mapping module configured to map the panoramic image to a preset world model in such a manner that a virtual world is constructed inside the preset world model. The disposing module configured to dispose a vehicle model at a position, corresponding to a real vehicle, in the virtual world. The rendering and outputting module configured to render and output an image, corresponding to a specified view point, in the virtual world, the specified view point being located on the preset world model and faces towards a center of the vehicle model.

In some embodiments, the construction module includes a splicing unit, a determination unit, a compression model construction unit, a mapping unit, a compression unit, and a mapping relationship construction unit. The splicing unit is configured to splice the original images captured by the plurality of on-vehicle lenses to obtain an initial panoramic image. The determination unit is configured to determine an image outside a circular image, with a center of the real vehicle as a center of a circle and a preset length as a radius in the initial panoramic image, as a to-be-compressed image. The compression model construction unit is configured to construct a preset compression model including a center of a sphere. The mapping unit is configured to map the to-be-compressed image to the preset compression model by taking the center of the sphere as a view point. The compression unit is configured to project, by pulling the view point to infinity, the to-be-compressed image mapped to the preset compression model, to a plane of the circular image to generate a compressed panoramic image. The mapping relationship construction unit is configured to construct the coordinate mapping relationship based on the compressed panoramic image and the original images captured by the plurality of on-vehicle lenses. The compression model construction unit includes a first determination sub-unit, a second determination sub-unit, a third determination sub-unit, and a fourth determination sub-unit. The first determination sub-unit is configured to determine two first points of intersection of an auxiliary line and the initial panoramic image, the auxiliary line being parallel to a side of the initial panoramic image and passes through the center of the circle. The second determination sub-unit is configured to determine a target point, a connecting line between the center of the circle and the target point being perpendicular to the initial panoramic image, and the target point forming a preset angle with each of the two first points of intersection. The third determination sub-unit is configured to determine a target distance from the target point to a second point of intersection formed between the auxiliary line and the circular image. The fourth determination sub-unit is configured to determine a closed structure as the preset compression model, the closed structure being located at a side of the circular image facing towards the target point and being formed by a sphere with the target point as a center of sphere and the target distance as a radius.

In some embodiments, the splicing unit includes a cropping sub-unit, a projection transformation sub-unit, and a splicing sub-unit. The cropping sub-unit is configured to crop an ROI of each of the original images. The projection transformation sub-unit is configured to perform projection transformation on the cropped ROIs of the original images to generate top views. The splicing sub-unit is configured to splice the top views corresponding to the plurality of on-vehicle lenses to generate the initial panoramic image. And/or, the preset world model is captured by scaling the preset compression model.

In some embodiments, the on-vehicle lenses are fisheye lenses; the construction module includes a distortion correction sub-unit configured to perform distortion correction on the original images; and/or, coordinate data is in a double-precision floating-point format.

An electronic device includes a memory, a processor, and computer programs stored on the memory and executable by the processor. The processor executes the computer programs to perform the display method of the on-vehicle AVM according to any one of the above embodiments.

A computer-readable storage medium stores computer programs, and the computer programs are executed by a processor to perform steps of the display method of the on-vehicle according to any one of the above embodiments.

DESCRIPTION OF EMBODIMENTS

The present disclosure is further described below with reference to the embodiments, which will not limit the scope of the described embodiments.

Embodiment 1

Figure 1:
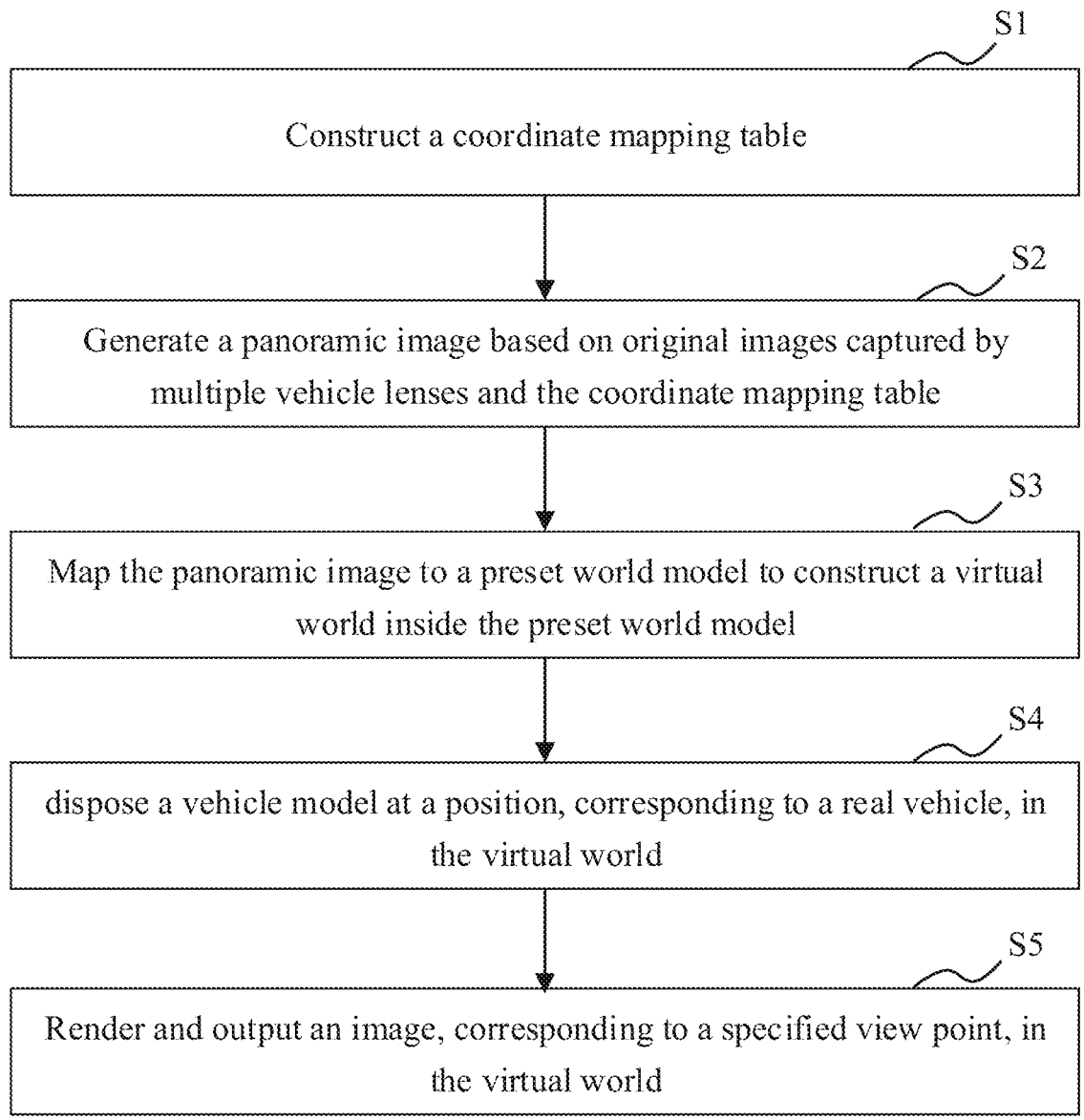
FIG. 1 is a flowchart of a display method of an on-vehicle AVM according to Embodiment 1 of the present disclosure.

The present embodiment provides a display method of an on-vehicle AVM. As shown in FIG. 1, the display method is performed based on multiple on-vehicle lenses, and includes S1 to S5.

At S1, a coordinate mapping table is constructed.

At S2, a panoramic image is generated based on original images captured by multiple on-vehicle lenses and the coordinate mapping table.

At S3, the panoramic image is mapped to a preset world model to construct a virtual world inside the preset world model.

At S4, a vehicle model is disposed at a position, corresponding to a real vehicle, in the virtual world.

At S5, an image, corresponding to a specified view point, in the virtual world is rendered and output.

In this embodiment, the constructed coordinate mapping table represents a coordinate mapping relationship between a panoramic image generated by splicing original images captured by the multiple on-vehicle lenses and each original images captured by the plurality of on-vehicle lenses. The construction of the coordinate mapping table requires only one time generation of the panoramic image and then an image transformation can be performed through the table lookup interpolation according to the original images captured by the multiple on-vehicle lenses and the constructed coordinate mapping table without changing the on-vehicle lenses and other components, so as to generate a panoramic image. The coordinate calculation not only reduces calculation amount, but also avoids the decline in the image quality.

In this embodiment, the view point is located on the preset world model and faces towards a center of the vehicle model. The construction of the virtual world corresponding to the real world and simulating a real world can calculate all images in the virtual world under all view angles by only one calculation. Thus, in the virtual world, the observation can be performed under any view angles and any FOV, which reduces the calculation amount, facilitates the realization of a real-time preview, and avoids poor user experiences such as stuttering and image tearing.

Embodiment 2

Figure 2:
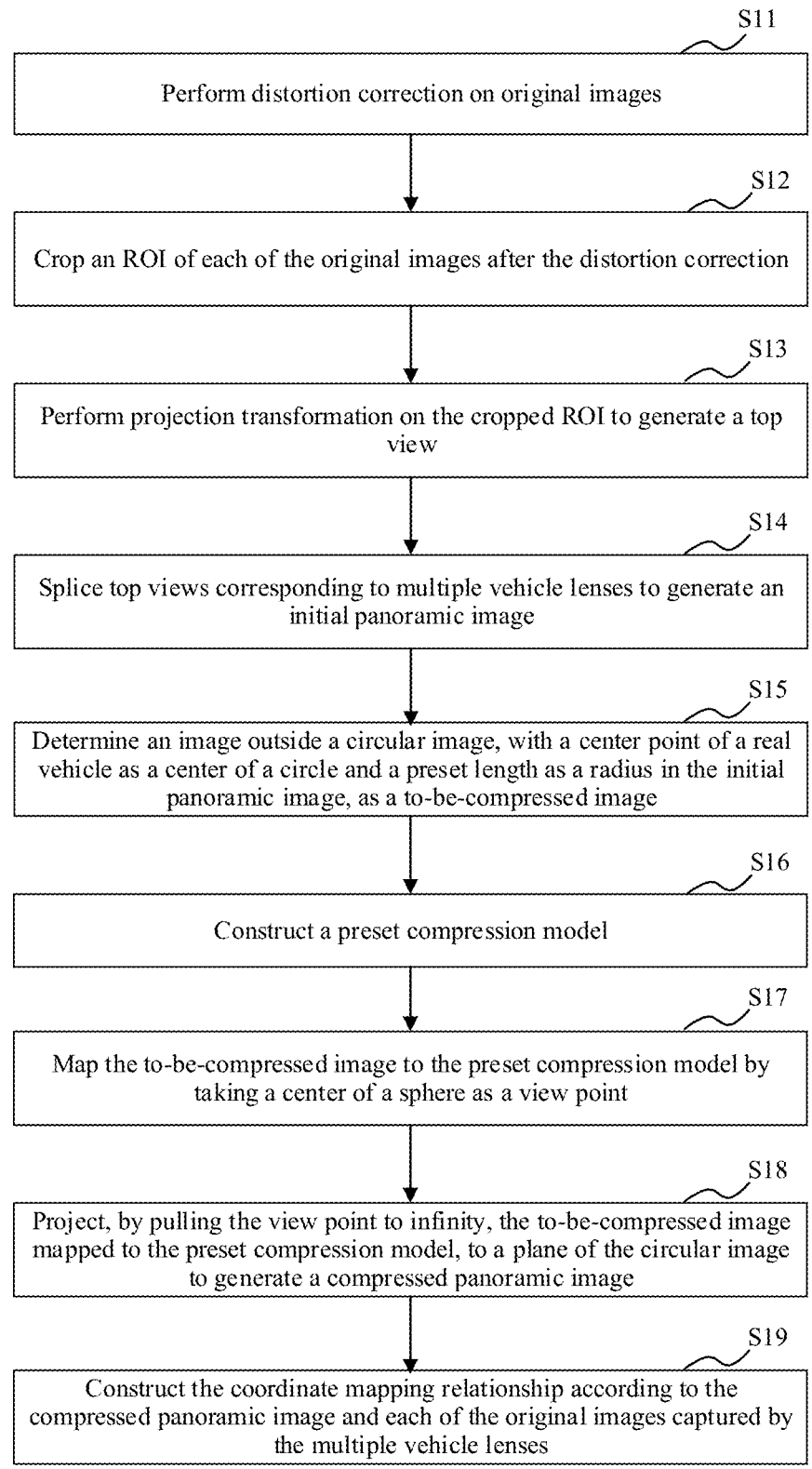
FIG. 2 is a flowchart of a S1 in the display method of the on-vehicle AVM according to Embodiment 2 of the present disclosure.

This embodiment provides a display method of an on-vehicle AVM based on Embodiment 1. In this embodiment, the on-vehicle lenses are fisheye lenses, and there are four fisheye lenses, which can be distributed in four directions, namely front, back, left and right of the vehicle. Referring to FIG. 2, in this embodiment, S1 includes the steps S11 to S16.

At S11, distortion correction is performed on the original images.

At S12, an ROI of each of the original images after the distortion correction is cropped.

Figure 3:
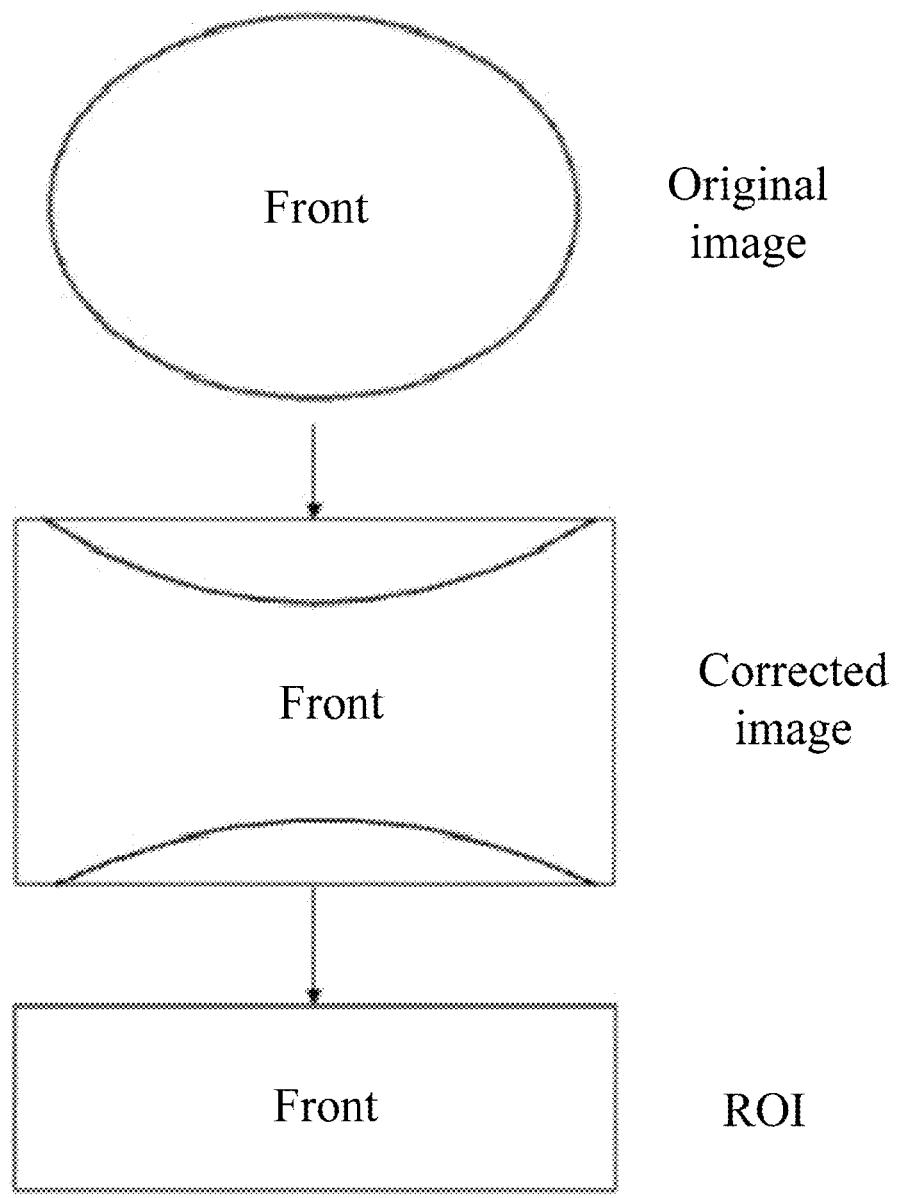
FIG. 3 is a schematic diagram of distortion correction and ROI cropping of the display method of the on-vehicle AVM according to Embodiment 2 of the present disclosure.

Referring to FIG. 3, taking the fisheye lens in the front of the vehicle as an example, an original image captured by this fisheye lens has a serious distortion, and distortion correction is performed on the original image to obtain a corrected image. With the corrected image, it is convenient to perform ROI cropping. The ROI can be cropped according to actual application. In this embodiment, the ROI is an image factor related to vehicle operation, so as to discard a meaningless image region. For example, the image factor of the sky can be discarded according to the actual needs to reduce the calculation amount. In this regard, a coordinate relationship function $f_w(x,y)$ between the image after distortion correction and ROI cropping and the original image, where (x,y) denotes the coordinates of the original image.

At S13, projection transformation is performed on the cropped ROI to generate a top view.

In this embodiment, the projection transformation is intended to transform the input processed original image into the top view, so as to facilitate subsequent image splicing. In this embodiment, a 3*3 projection matrix M is obtained through projection transformation. The 2D coordinates (x,y) of the original image are expanded to a 3D coordinates (x,y,0), and the projected image coordinates are obtained by multiplying the 3D coordinates (x,y,0) and the matrix M. Similarly, a matrix M' configured to restore the projected image coordinates (x',y',0) to the original image coordinates (x,y,0) can also be obtained.

At S14, top views corresponding to the multiple fisheye lenses are spliced to generate the initial panoramic image.

Figure 4:
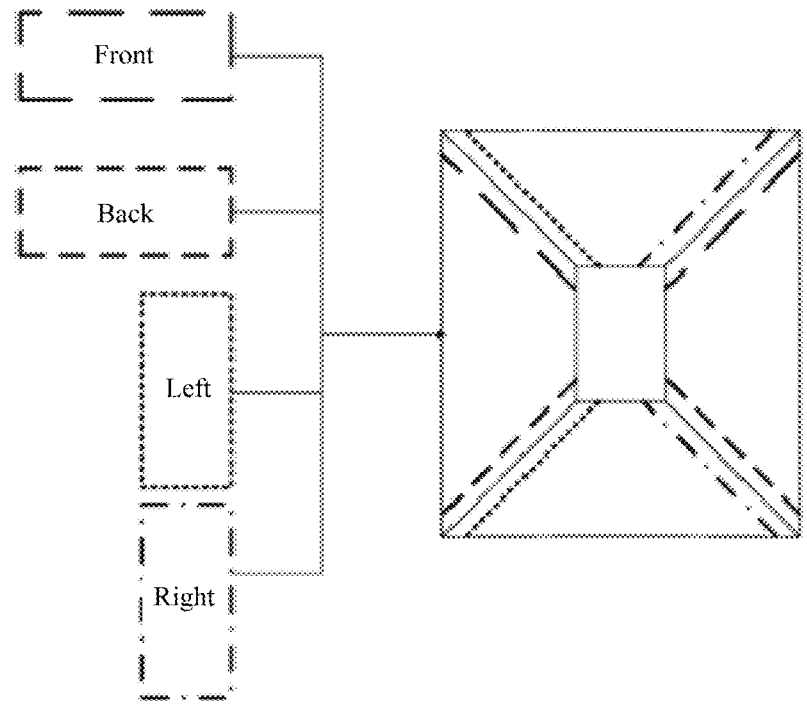
FIG. 4 is a schematic diagram of image splicing in the display method of the on-vehicle AVM according to Embodiment 2 of the present disclosure.

In this embodiment, the splicing can be performed through a traditional calibration target so as to generate an initial panoramic image under the top view angle. The initial panoramic image is $f(x,y)=w_1*(x_1,y_1)+w_2*(x_2,y_2)$. For example, $(x_1,y_1)$ and $(x_2,y_2)$ are the coordinates of two spliced original images $0<=w_1<=1$, and $w_1+w_2=1$. The weights $w_1$ and $w_2$ corresponding to the overlapping parts of the two original images are linearly related to a distance between the coordinates of pixels and a splicing line. For example, when $w_1$ changes from 1 to 0 and $w_2$ changes from 0 to 1, a smooth transition of the overlapping regions. FIG. 4 shows an initial panoramic image generated by splicing top views corresponding to the fisheye lenses located at the front, rear, left and right of the vehicle.

At S15, an image outside a circular image with a center of the real vehicle as a center of a circle and a preset length as a radius in the initial panoramic image, is determined as a to-be-compressed image.

In this embodiment, since the subsequent fisheye compression will cause lateral distortion of the initial panoramic image, in order to ensure that there is no distortion on the images around the vehicle, the circular image is not compressed, and only the image outside the circular image is compressed.

At S16, the preset compression model is constructed.

Figure 5:
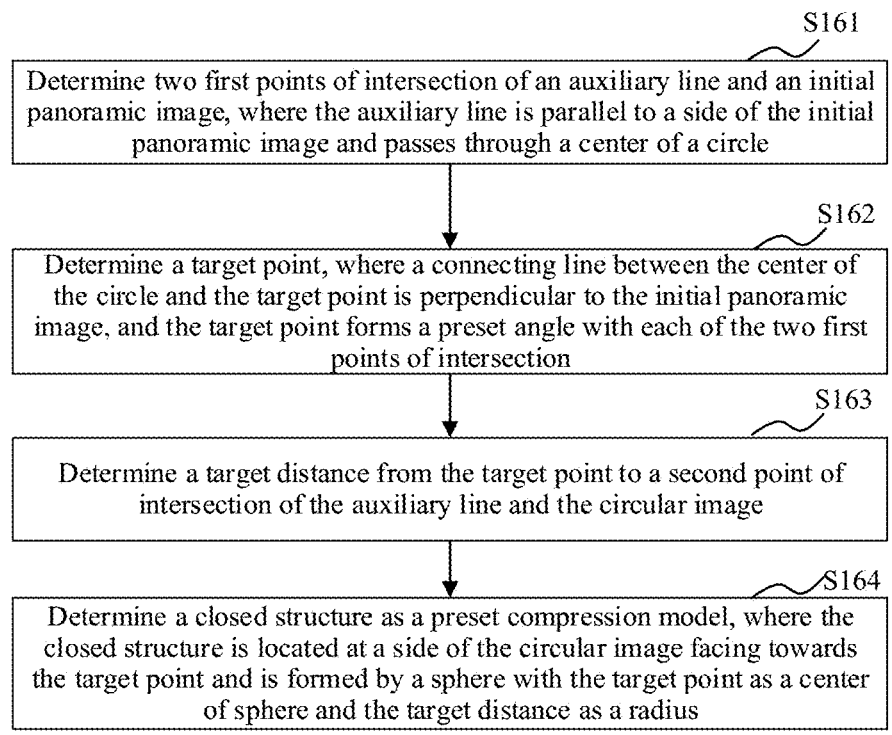
FIG. 5 is a flowchart of a S16 in the display method of the on-vehicle AVM according to Embodiment 2 of the present disclosure.

Referring to FIG. 5, in this embodiment, S16 can include steps S161 to S164.

At S161, two first points of intersection of an auxiliary line and the initial panoramic image are determined, where the auxiliary line is parallel to a side of the initial panoramic image and passes through the center of the circle.

At S162, a target point is determined. A connecting line between the center of the circle and the target point is perpendicular to the initial panoramic image, and the target point forms a preset angle with each of the two first points of intersection.

At S163, a target distance from the target point to a second point of intersection of the auxiliary line and the circular image is determined.

At S164, a closed structure is determined as the preset compression model, and the closed structure is located at a side of the circular image facing towards the target point and is formed by a sphere with the target point as a center of sphere and the target distance as a radius.

Figure 6:
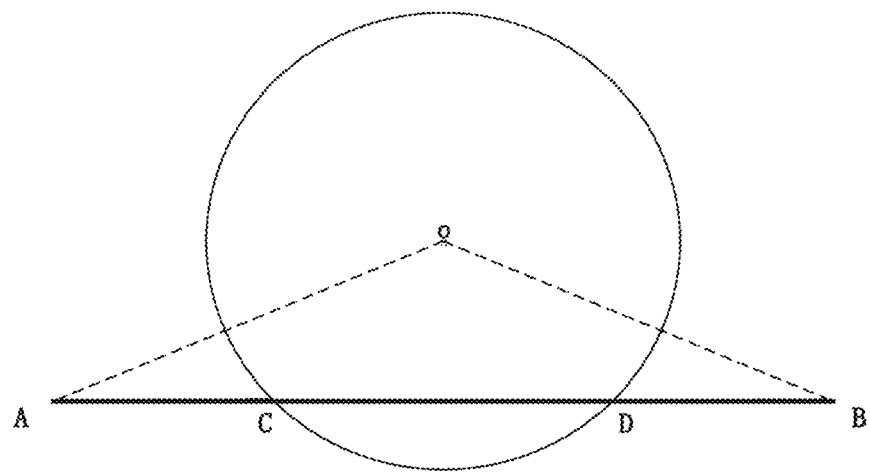
FIG. 6 is a section diagram of a fisheye compression model in the display method of the on-vehicle AVM according to Embodiment 2 of the present disclosure.

Referring to FIG. 6, in this embodiment, a length-to-width ratio of the initial panoramic image is 1:1. A point A and a point B are the first points of intersection of the auxiliary line and the initial panoramic image, and a distance between the point A and the point B is the side length of the initial panoramic image. Point O denotes a target point, and a degree of ∠AOB is a preset angle. CD denotes a diameter of the circular image, and a point C and a point D are second points of intersection of the auxiliary line and the circular image. AC and DB correspond to the images to be compressed, and OC and OD denote target distances. The preset compression model that is finally formed has a large hemisphere structure.

At S17, the to-be-compressed image is mapped to the preset compression model by taking the center of the sphere as a view point.

Figure 7:
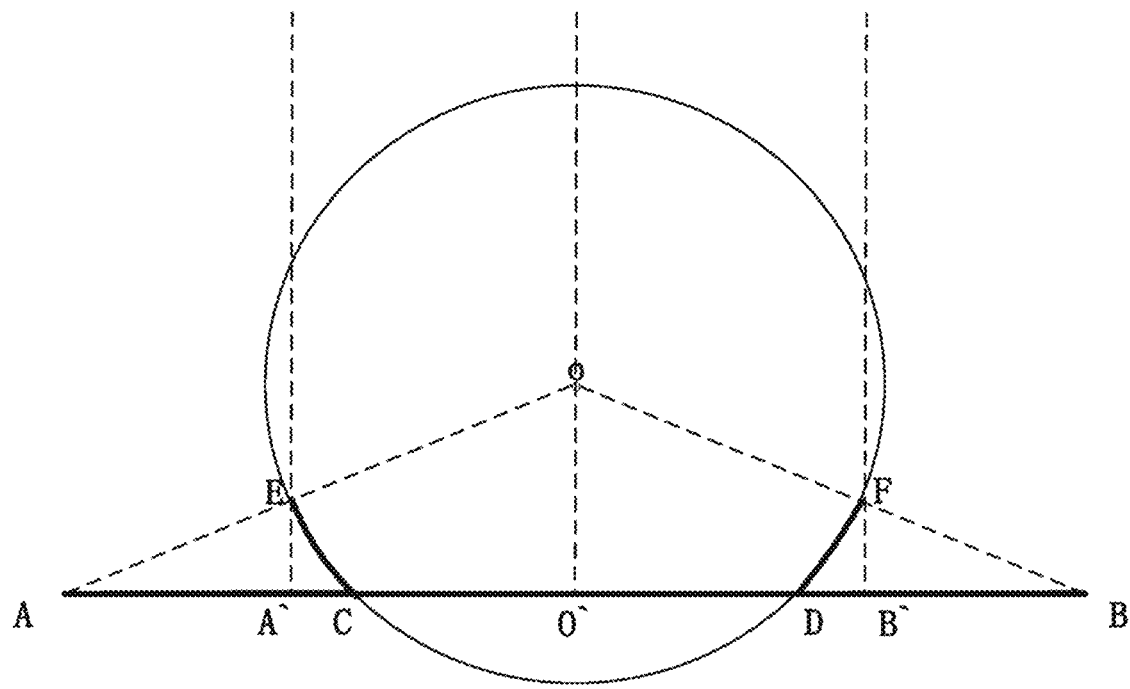
FIG. 7 is a compression diagram of the fisheye compression model in the display method of the on-vehicle AVM according to Embodiment 2 of the present disclosure.

In this embodiment, the circular image not compressed corresponds to a circular section of the preset compression model, and the images to be compressed outside the circular section are mapped to a spherical arc surface of the preset compression model according to the principle of fisheye imaging. Referring to FIG. 7, AC is compressed to arc CE, and DB is compressed to arc DF. In this embodiment, the compression ratio and range of the to-be-compressed image are related to a size of ∠AOB, and the compressible range is larger when the angle AOB is close to 180°.

At S18, the to-be-compressed image mapped to the preset compression model is projected to a plane of the circular image by pulling the view point to infinity, so as to generate a compressed panoramic image.

In some implementations, referring to FIG. 7, the arc CE is projected to A'C, the arc DF is projected to DB', and CD remains unchanged. Thus, the initial panoramic image with the side length of AB is compressed to a panoramic image with the side length of A'B'. In this way, the size of the panoramic image is reduced without the decline in the image quality and without reducing the view field range, which avoids excessive memory occupation and improves the performance of the on-vehicle AVM.

At S19, the coordinate mapping relationship is constructed according to the compressed panoramic image and the original images captured by the fisheye lenses.

In this embodiment, a functional relationship between the compressed panoramic image and the to-be-compressed initial panoramic image to be compressed is denoted as $f_c(x,y)$.

Thus, a function from an input end of the fisheye lens to an output end of the panoramic image is as follows:

$$f_c(w_1 * ((f_w(x_1, y_1), 0) * M) + w_2 * (f_w(x_2, y_2), 0) * M).$$

In the actual calculation process, the coordinates of the output end are traversed to search the coordinates of the input end, which requires reversing the input and output of each of the above functions.

In this embodiment, S1 is performed only one time. In this process, the processed data are all image coordinates (x,y) rather than real pixels. The whole process can be regarded as the transformation of image coordinates. During the transformation, the data can have a double-precision floating-point format.

Figure 8:
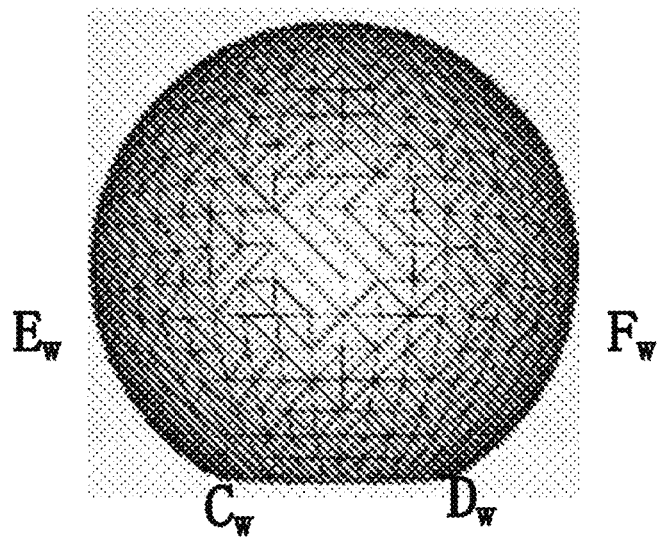
FIG. 8 is a structural diagram of a preset world model in the display method of the on-vehicle AVM according to Embodiment 2 of the present disclosure.

In this embodiment, in order to restore the scene of the real world and reduce the influence of distortion, the preset world model is obtained by scaling the preset compression model. That is, the preset world model is consistent with the preset compressed model, and a mapping range of the preset world model is consistent with a mapping range of the compressed panoramic image. Referring to FIG. 8, points $E_w$, $C_w$, $D_w$, and $F_w$ on the preset world model corresponds to points A'C, D, and B' on the right side view, respectively.

Figure 9:
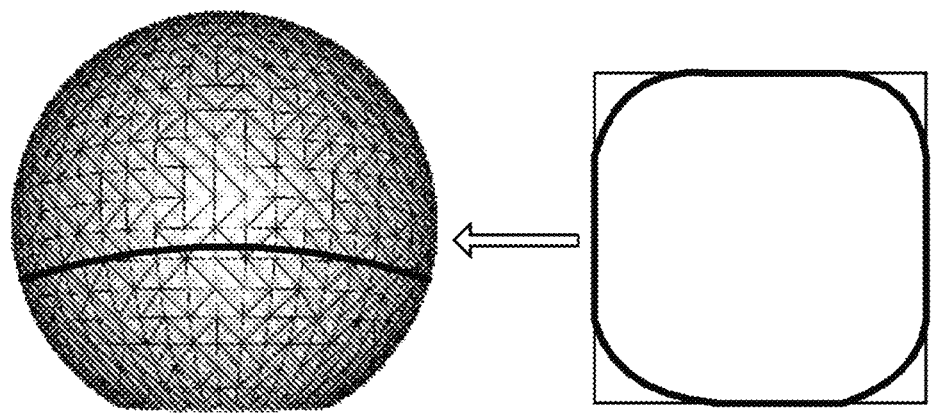
FIG. 9 shows a corresponding relationship between a panoramic image and the preset world model in the display method of the on-vehicle AVM according to Embodiment 2 of the present disclosure.

In this embodiment, since the virtual world is observed inside the preset world model, it is necessary to specify the inside-out inversion when mapping the panoramic image to the preset world model, so as to construct the virtual world inside the preset world model. FIG. 9 shows a corresponding relationship between the panoramic image and the preset world model. The region below a mark line of the preset world model corresponds to the panoramic image, and an inner wall part and a bottom part below the mark line correspond to the panoramic image.

Figure 10:
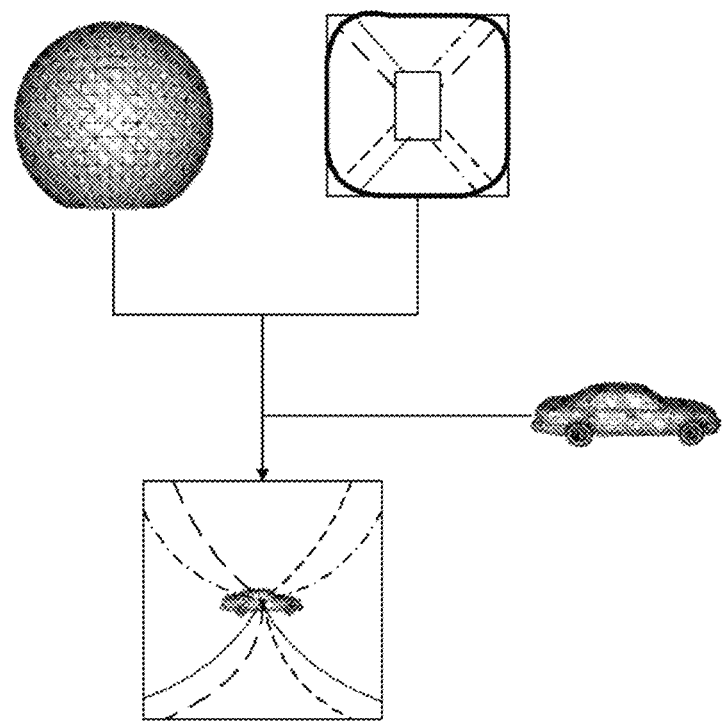
FIG. 10 is a diagram of constructing a virtual world of the display method of the on-vehicle AVM according to Embodiment 2 of the present disclosure.

Finally, the vehicle model is disposed at a position corresponding to a real vehicle in the virtual world, that is, the position in the virtual world corresponds to the real vehicle in the real world, so as to finally construct a complete virtual world when simulating the real world. The completed virtual world is shown in FIG. 10.

Figure 11:
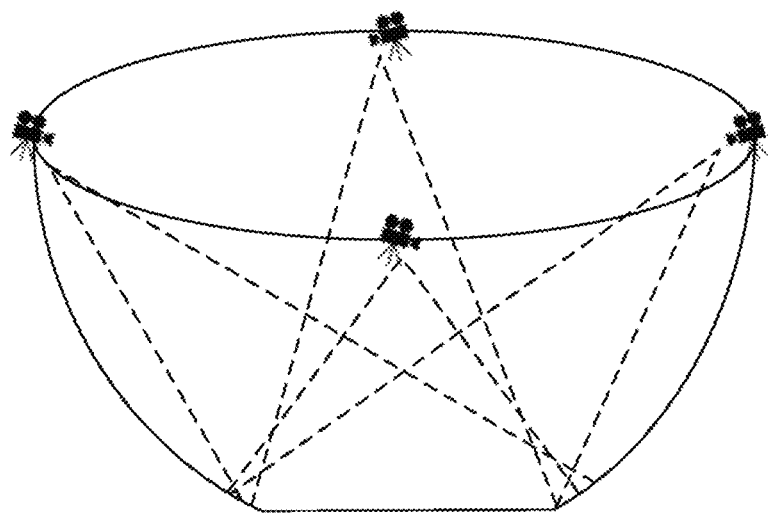
FIG. 11 is a schematic diagram of a view point in the display method of the on-vehicle AVM according to Embodiment 2 of the present disclosure.
Figure 12:
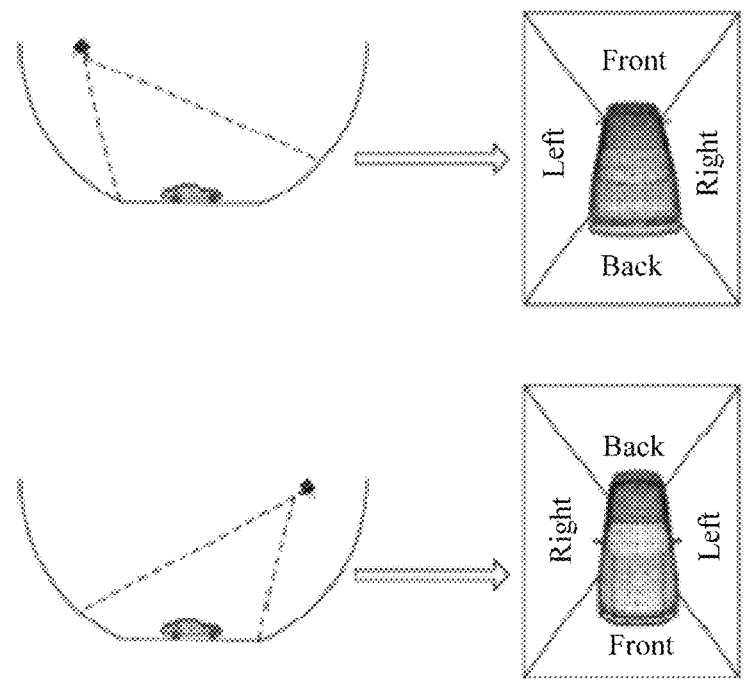
FIG. 12 is a corresponding relationship between the view point and an output image in the display method of the on-vehicle AVM according to Embodiment 2 of the present disclosure.

In this embodiment, referring to FIG. 11, the view point is disposed on an equatorial arc of the preset world model and always faces towards the center of the vehicle model. In this embodiment, the position of the view point can be changed by sliding the screen left and right. For example, if the view point is slid to the left, the view point is rotated around the center of the sphere to achieve an anticlockwise rotation. If the view point is slid to the right, the view point is rotated around the center of the sphere to achieve a clockwise rotation. Referring to FIG. 12, after the view point is specified, the rendered image can be output to the on-vehicle screen through a 3D render engine.

On the basis of Embodiment 1, this embodiment also introduces fisheye compression, reducing the size of the panoramic image without the decline in the image quality and without reducing the field view range, avoiding excessive memory occupation, and improving the performance of the on-vehicle AVM. The virtual world is constructed through the preset world model consistent with the fisheye compression model, which can restore the real world and reduce distortion, thereby improving the user experience.

Embodiment 3

Figure 13:
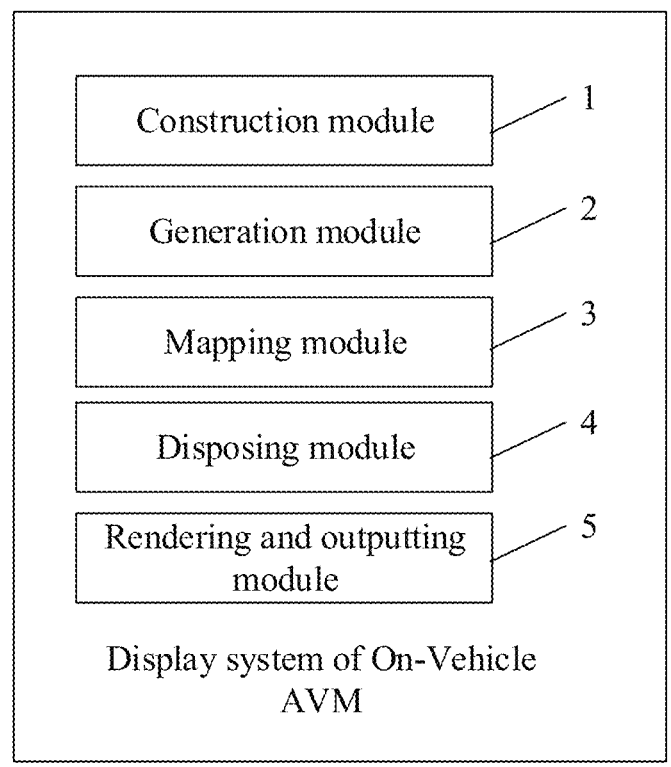
FIG. 13 is a block diagram of a display system of an on-vehicle AVM according to Embodiment 3 of the present disclosure.

This embodiment provides a display system of an on-vehicle AVM based on multiple on-vehicle lenses. As shown in FIG. 13, the display system includes a construction module 1, a generation module 2, a mapping module 3, a disposing module 4, and a rendering and outputting module 5. The construction module 1 is configured to construct a coordinate mapping table. The generation module 2 is configured to generate the panoramic image based on the original images captured by the multiple on-vehicle lenses and the coordinate mapping table. The mapping module 3 is configured to map the panoramic image to a preset world model to construct a virtual world inside the preset world model. The disposing module 4 is configured to dispose a vehicle model at a position, corresponding to a real vehicle, in the virtual world. The rendering and outputting module 5 is configured to render and output an image corresponding to a specified view point in the virtual world.

In this embodiment, the constructed coordinate mapping table represents a coordinate mapping relationship between a panoramic image generated by splicing original images captured by the multiple on-vehicle lenses and each original images captured by the plurality of on-vehicle lenses. The construction of the coordinate mapping table requires only one time generation of the panoramic image and then an image transformation can be performed through the table lookup interpolation according to the original images captured by the multiple on-vehicle lenses and the constructed coordinate mapping table without changing the on-vehicle lenses and other components, so as to generate a panoramic image. The coordinate calculation not only reduces calculation amount, but also avoids the decline in the image quality.

In this embodiment, the view point is located on the preset world model and faces towards a center of the vehicle model. The construction of the virtual world corresponding to the real world and simulating a real world can calculate all images in the virtual world under all view angles by only one calculation. Thus, in the virtual world, the observation can be performed under any view angles and any field of view (FOV), which reduces the calculation amount, facilitates the realization of a real-time preview, and avoids poor user experiences such as stuttering and image tearing.

Embodiment 4

Figure 14:
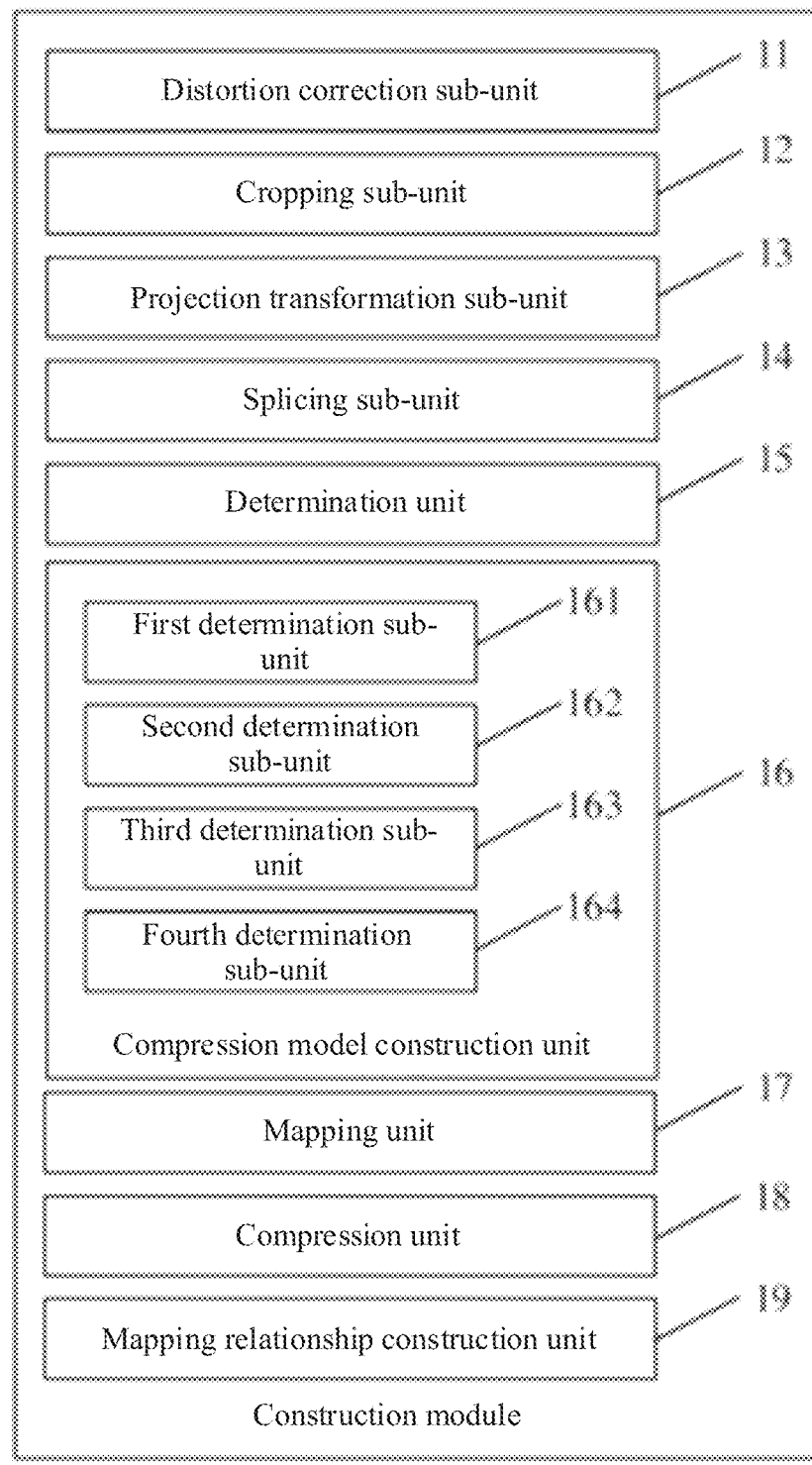
FIG. 14 is a block diagram of a construction module of the display system of an on-vehicle AVM according to Embodiment 4 of the present disclosure.

This embodiment provides a display system of an on-vehicle AVM based on Embodiment 3. In this embodiment, the on-vehicle lenses are fisheye lenses, and there are four fisheye lenses, which can be distributed in four directions, namely front, back, left and right of the vehicle. Referring to FIG. 14, in this embodiment, the construction module 1 includes a distortion correction sub-unit 11, a cropping sub-unit 12, a projection transformation sub-unit 13, a splicing sub-unit 14, a determination unit 15, a compression model construction unit 16, a mapping unit 17, a compression unit 18, and a mapping relationship construction unit 19.

The distortion correction subunit 11 is configured to perform distortion correction on the original images.

The cropping subunit 12 is configured to crop an ROI of each of the original images after the distortion correction.

Referring to FIG. 3, taking the fisheye lens in the front of the vehicle as an example, an original image captured by this fisheye lens has a serious distortion, and distortion correction is performed on the original image to obtain a corrected image. With the corrected image, it is convenient to perform ROI cropping. The ROI can be cropped according to actual application. In this embodiment, the ROI is an image factor related to vehicle operation, so as to discard a meaningless image region. For example, the image factor of the sky can be discarded according to the actual needs to reduce the calculation amount. In this regard, a coordinate relationship function $f_w(x,y)$ between the image after distortion correction and ROI cropping and the original image, where (x,y) denotes the coordinates of the original image.

The projection transformation sub-unit 13 is configured to perform projection transformation on the cropped ROI to generate a top view.

In this embodiment, the projection transformation is intended to transform the input processed original image into the top view, so as to facilitate subsequent image splicing. In this embodiment, a 3*3 projection matrix M is obtained through projection transformation. The 2D coordinates (x,y) of the original image are expanded to a 3D coordinates (x,y,0), and the projected image coordinates are obtained by multiplying the 3D coordinates (x,y,0) and the matrix M. Similarly, a matrix M' configured to restore the projected image coordinates (x',y',0) to the original image coordinates (x,y,0) can also be obtained.

The splicing sub-unit 14 is configured to splice top views corresponding to the multiple fisheye lenses to generate the initial panoramic image.

In this embodiment, the splicing can be performed through a traditional calibration target so as to generate an initial panoramic image under the top view angle. The initial panoramic image is $f(x,y)=w_1*(x_1,y_1)+w_2*(x_2,y_2)$. For example, $(x_1,y_1)$ and $(x_2,y_2)$ are the coordinates of two spliced original images $0<=w_1<=1$, and $w_1+w_2=1$. The weights $w_1$ and $w_2$ corresponding to the overlapping parts of the two original images are linearly related to a distance between the coordinates of pixels and a splicing line. For example, when $w_1$ changes from 1 to 0 and $w_2$ changes from 0 to 1, a smooth transition of the overlapping regions. FIG. 4 shows an initial panoramic image generated by splicing top views corresponding to the fisheye lenses located at the front, rear, left and right of the vehicle.

The determination unit 15 is configured to determine an image outside a circular image, with a center of the real vehicle as a center of a circle and a preset length as a radius in the initial panoramic image, as a to-be-compressed image.

In this embodiment, since the subsequent fisheye compression will cause lateral distortion of the initial panoramic image, in order to ensure that there is no distortion on the images around the vehicle, the circular image is not compressed, and only the image outside the circular image is compressed.

The compression model construction unit 16 is configured to construct a preset compression model.

Referring to FIG. 14, the compression model construction unit 16 in this embodiment can include a first determination sub-unit 161, a second determination sub-unit 162, a third determination sub-unit 163, and a fourth determination sub-unit 164.

The first determination sub-unit 161 is configured to determine two first points of intersection of an auxiliary line and the initial panoramic image, where the auxiliary line is parallel to a side of the initial panoramic image and passes through the center of the circle.

The second determination sub-unit 162 is configured to determine a target point, where the connecting line between the center of the circle and the target point is perpendicular to the initial panoramic image, and the target point forms a preset angle with each of the two first points of intersection.

The third determination sub-unit 163 is configured to determine a target distance from the target point to a second point of intersection of the auxiliary line and the circular image.

The fourth determination sub-unit 164 is configured to determine a closed structure as the preset compression model, and the closed structure is located at a side of the circular image facing towards the target point and is formed by a sphere with the target point as a center of sphere and the target distance as a radius.

Referring to FIG. 6, in this embodiment, a length-to-width ratio of the initial panoramic image is 1:1. A point A and a point B are the first points of intersection of the auxiliary line and the initial panoramic image, and a distance between the point A and the point B is the side length of the initial panoramic image. Point O denotes a target point, and a degree of ∠AOB is a preset angle. CD denotes a diameter of the circular image, and a point C and a point D are second points of intersection of the auxiliary line and the circular image. AC and DB correspond to the images to be compressed, and OC and OD denote target distances. The preset compression model that is finally formed has a large hemisphere structure.

The mapping unit 17 is configured to map the image be compressed to a preset compression model by taking spherical center as a view point.

In this embodiment, the circular image not compressed corresponds to a circular section of the preset compression model, and the images to be compressed outside the circular section are mapped to a spherical arc surface of the preset compression model according to the principle of fisheye imaging. Referring to FIG. 7, AC is compressed to arc CE, and DB is compressed to arc DF. In this embodiment, the compression ratio and range of the to-be-compressed image are related to a size of ∠AOB, and the compressible range is larger when the angle AOB is close to 180°.

The compression unit 18 is configured to project, by pulling the view point to infinity, the to-be-compressed image mapped to the preset compression model, to a plane of the circular image to generate a compressed panoramic image.

In some implementations, referring to FIG. 7, the arc CE is projected to A'C, the arc DF is projected to DB', and CD remains unchanged. Thus, the initial panoramic image with the side length of AB is compressed to a panoramic image with the side length of A'B'. In this way, the size of the panoramic image is reduced without the decline in the image quality and without reducing the view field range, which avoids excessive memory occupation and improves the performance of the on-vehicle AVM.

The mapping relationship construction unit 19 is configured to construct the coordinate mapping relationship according to the compressed panoramic image and the original images captured by each fisheye lens.

In this embodiment, a functional relationship between the compressed panoramic image and the to-be-compressed initial panoramic image is denoted as $f_c(x,y)$.

Thus, a function from an input end of the fisheye lens to an output end of the panoramic image is as follows:

$$f_c(w_1 * ((f_w(x_1, y_1), 0) * M) + w_2 * (f_w(x_2, y_2), 0) * M).$$

In the actual calculation process, the coordinates of the output end are traversed to search the coordinates of the input end, which requires reversing the input and output of each of the above functions.

In this embodiment, the construction module 1 only needs to be called once. In this process, the processed data are all image coordinates (x,y) rather than real pixels. The whole process can be regarded as the transformation of image coordinates. During the transformation, the data can have a double-precision floating-point format.

In this embodiment, in order to restore the scene of the real world and reduce the influence of distortion, the preset world model is obtained by scaling the preset compression model. That is, the preset world model is consistent with the preset compressed model, and a mapping range of the preset world model is consistent with a mapping range of the compressed panoramic image. Referring to FIG. 8, points $E_w$, $C_w$, $D_w$, and $F_w$ on the preset world model corresponds to points A'C, D, and B' on the right side view, respectively.

In this embodiment, since the virtual world is observed inside the preset world model, it is necessary to specify the inside-out inversion when mapping the panoramic image to the preset world model, so as to construct the virtual world inside the preset world model. FIG. 9 shows a corresponding relationship between the panoramic image and the preset world model. The region below a mark line of the preset world model corresponds to the panoramic image, and an inner wall part and a bottom part below the mark line correspond to the panoramic image.

Finally, the vehicle model is disposed at a position corresponding to a real vehicle in the virtual world, that is, the position in the virtual world corresponds to the real vehicle in the real world, so as to finally construct a complete virtual world when simulating the real world. The completed virtual world is shown in FIG. 10.

In this embodiment, referring to FIG. 11, the view point is disposed on an equatorial arc of the preset world model and always faces towards the center of the vehicle model. In this embodiment, the position of the view point can be changed by sliding the screen left and right. For example, if the view point is slid to the left, the view point is rotated around the center of the sphere to achieve an anticlockwise rotation. If the view point is slid to the right, the view point is rotated around the center of the sphere to achieve a clockwise rotation. Referring to FIG. 12, after the view point is specified, the rendered image can be output to the on-vehicle screen through a 3D render engine.

On the basis of Embodiment 1, this embodiment also introduces fisheye compression, reducing the size of the panoramic image without the decline in the image quality and without reducing the field view range, avoiding excessive memory occupation, and improving the performance of the on-vehicle AVM. The virtual world is constructed through the preset world model consistent with the fisheye compression model, which can restore the real world and reduce distortion, thereby improving the user experience.

Embodiment 5

This embodiment provides an electronic device, which can be a computing device (for example, a server device). The electronic device includes a memory, a processor, and computer programs stored on the memory and executable in the processor. The processor executes the computer program to implement the display method of the on-vehicle AVM according to Embodiment 1 or Embodiment 2 of the present disclosure.

Figure 15:
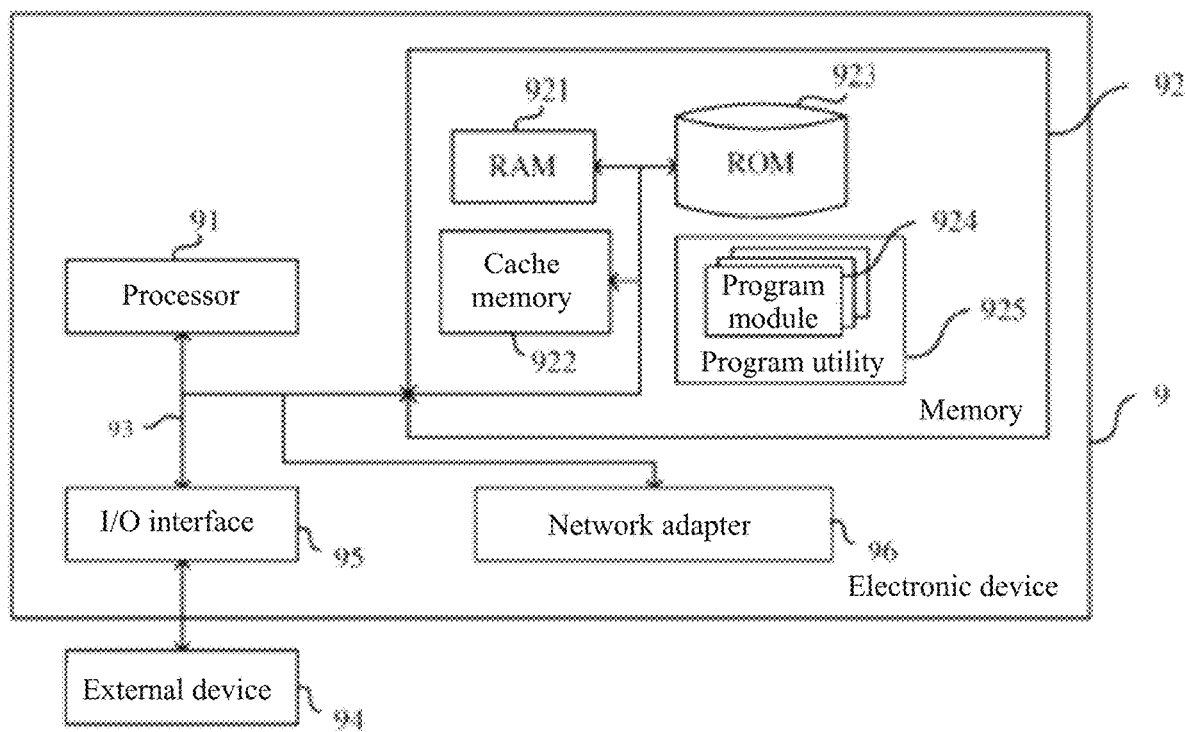
FIG. 15 is a structural diagram of an electronic device according to Embodiment 5 of the present disclosure.

FIG. 15 is a structural diagram of hardware according to this embodiment. As shown in FIG. 15, an electronic device 9 includes at least one processor 91, at least one memory 92, and a bus 93 that is configured to connect different system components (including the processor 91 and the memory 92).

The bus 93 includes a data bus, an address bus, and a control bus.

The memory 92 includes a volatile memory, such as a random access memory (RAM) 921 and/or a cache memory 922, and can include a read-only memory (ROM) 923.

The memory 92 can include a program/utility tool 925 including a set of (at least one) program module 924, and the program module 924 includes, but is not limited to: an operating system, one or more applications, and other program module and program data. Each or a certain combination of these examples can include an implementation of a network environment.

The processor 91 runs computer programs stored on the memory 92 to perform various functional applications and data processing, such as the display method of the on-vehicle AVM according to Embodiment 1 or Embodiment 2 of the present disclosure.

The electronic device 9 can communicate with one or more external devices 94 (for example, a keyboard, a pointing device, etc.). Such communication can be performed through an input/output (I/O) interface 95. The electronic device 9 can communicate with one or more networks (for example, a local area network (LAN), a wide area network (WAN), and/or a public network such as the Internet) through a network adapter 96. The network adapter 96 communicates with other modules of the electronic device 9 through the bus 93. It should be understood that although not shown in the figure, other hardware and/or software modules can be used in combination with the electronic device 9, including but not limited to: microcode, a device driver, a redundant processor, an external disk drive array, a redundant arrays of independent disks (RAID) system, a tape driver, and a data backup storage system.

It should be noted that although several units/modules or sub-units/sub-modules of the electronic device are described in detail above, such division is merely illustrative but not restrictive. Indeed, the features and functions of two or more units/modules described above can be embodied in one unit/module according to the implementations of the present disclosure. Conversely, the feature and function of one unit/module described above may be further embodied by multiple units/modules.

Embodiment 6

This embodiment provides a computer-readable storage medium. The computer-readable storage medium stores computer programs, where the computer programs are executed by a processor to perform the display method of the on-vehicle AVM according to Embodiment 1 or Embodiment 2.

The computer-readable storage medium can include, but is not limited to a portable computer disk, a hard disk, an RAM, an ROM, an erasable programmable ROM, an optical storage device, and a magnetic storage device, or any suitable combination thereof.

In some embodiments, the present disclosure can also be implemented in the form of a program product, which includes program codes. When the program products are run on a terminal device, the program codes are configured to make the terminal device execute steps in the display method of the on-vehicle AVM according to Embodiment 1 or Embodiment 2 of the present disclosure.

The program code for implementing the present disclosure can be written in any combination of one or more programming languages. The program code can be completely executed on a user equipment, partially executed on the user equipment, executed as an independent software package, partially executed on the user equipment and partially executed on a remote device, or completely executed on the remote device.

Although the embodiments of the present disclosure have been described above, those skilled in the art should understand that these are only embodiments, and the scope of the present disclosure is defined by the appended claims. Those skilled in the art can make various changes or modifications to these embodiments without departing from the principle and essence of the present disclosure, but all these changes and modifications shall fall within the scope of the present disclosure.

The invention claimed is:

1. A display method of an on-vehicle around view monitor (AVM), performed based on a plurality of on-vehicle lenses and comprising:
    constructing a coordinate mapping table, the coordinate mapping table representing a coordinate mapping relationship between a first panoramic image generated by splicing first original images captured by the plurality of on-vehicle lenses and each of the first original images captured by the plurality of on-vehicle lenses;
    generating a second panoramic image based on second original images captured by the plurality of on-vehicle lenses and the coordinate mapping table;
    mapping the second panoramic image to a preset world model in such a manner that a virtual world is constructed inside the preset world model;
    disposing a vehicle model at a position, corresponding to a real vehicle, in the virtual world; and
    rendering and outputting an image, corresponding to a specified view point, in the virtual world, the specified view point being located on the preset world model and facing towards a center of the vehicle model.

2. The display method of the on-vehicle AVM according to claim 1,
    wherein said constructing the coordinate mapping table comprises:
        splicing the first original images captured by the plurality of on-vehicle lenses to obtain an initial panoramic image;
        determining an image outside a circular image with a center of the real vehicle as a center of a circle and a preset length as a radius in the initial panoramic image, as a to-be-compressed image;
        constructing a preset compression model comprising a center of a sphere;
        mapping the to-be-compressed image to the preset compression model by taking the center of the sphere as a view point;
        projecting, by pulling the view point to infinity, the to-be-compressed image mapped to the preset compression model, to a plane of the circular image to generate a compressed panoramic image, as the first panoramic image; and
        constructing the coordinate mapping relationship based on the compressed panoramic image and the first original images captured by the plurality of on-vehicle lenses, and
    wherein said constructing the preset compression model comprises:
        determining two first points of intersection of an auxiliary line and the initial panoramic image, wherein the auxiliary line is parallel to a side of the initial panoramic image and passes through the center of the circle;
        determining a target point, wherein a connecting line between the center of the circle and the target point is perpendicular to the initial panoramic image, and the target point forms a preset angle with each of the two first points of intersection;

determining a target distance from the target point to a second point of intersection of the auxiliary line and the circular image; and determining a closed structure as the preset compression model, wherein the closed structure is located at a side of the circular image facing towards the target point and is formed by a sphere with the target point as a center of sphere and the target distance as a radius.

3. The display method of the on-vehicle AVM according to claim 2, wherein said splicing the first original images captured by the plurality of on-vehicle lenses to obtain the initial panoramic image comprises:

cropping a region of interest (ROI) of each of the first original images;

performing projection transformation on the cropped ROIs of the first original images to generate top views; and splicing the top views corresponding to the plurality of on-vehicle lenses to generate the initial panoramic image.

4. The display method of the on-vehicle AVM according to claim 2, wherein the preset world model is obtained by scaling the preset compression model.

5. The display method of the on-vehicle AVM according to claim 2, wherein coordinate data have a double-precision floating-point format.

6. The display method of the on-vehicle AVM according to claim 1, wherein the on-vehicle lenses are fisheye lenses, and
wherein said constructing the coordinate mapping table comprises:

performing distortion correction on the original images.

7. An electronic device, comprising:

a memory;

a processor; and computer programs stored on the memory and executable by the processor, wherein the computer programs, when executed by the processor, cause the processor to:

construct a coordinate mapping table, the coordinate mapping table representing a coordinate mapping relationship between a first panoramic image generated by splicing first original images captured by a plurality of on-vehicle lenses and each of the first original images captured by the plurality of on-vehicle lenses;

generate a second panoramic image based on second original images captured by the plurality of on-vehicle lenses and the coordinate mapping table;

map the second panoramic image to a preset world model in such a manner that a virtual world is constructed inside the preset world model;

dispose a vehicle model at a position, corresponding to a real vehicle, in the virtual world; and render and output an image, corresponding to a specified view point, in the virtual world, the specified view point being located on the preset world model and facing towards a center of the vehicle model.

8. The electronic device according to claim 7, wherein said constructing the coordinate mapping table comprises:

splicing the first original images captured by the plurality of on-vehicle lenses to obtain an initial panoramic image;

determining an image outside a circular image with a center of the real vehicle as a center of a circle and a preset length as a radius in the initial panoramic image, as a to-be-compressed image;

constructing a preset compression model comprising a center of a sphere;

mapping the to-be-compressed image to the preset compression model by taking the center of the sphere as a view point;

projecting, by pulling the view point to infinity, the to-be-compressed image mapped to the preset compression model, to a plane of the circular image to generate a compressed panoramic image, as the first panoramic image; and constructing the coordinate mapping relationship based on the compressed panoramic image and the first original images captured by the plurality of on-vehicle lenses, and wherein said constructing the preset compression model comprises:

determining two first points of intersection of an auxiliary line and the initial panoramic image, wherein the auxiliary line is parallel to a side of the initial panoramic image and passes through the center of the circle;

determining a target point, wherein a connecting line between the center of the circle and the target point is perpendicular to the initial panoramic image, and the target point forms a preset angle with each of the two first points of intersection;

determining a target distance from the target point to a second point of intersection of the auxiliary line and the circular image; and determining a closed structure as the preset compression model, wherein the closed structure is located at a side of the circular image facing towards the target point and is formed by a sphere with the target point as a center of sphere and the target distance as a radius.

9. The electronic device according to claim 8, wherein said splicing the first original images captured by the plurality of on-vehicle lenses to obtain the initial panoramic image comprises:

cropping a region of interest (ROI) of each of the first original images;

performing projection transformation on the cropped ROIs of the first original images to generate top views; and splicing the top views corresponding to the plurality of on-vehicle lenses to generate the initial panoramic image.

10. The electronic device according to claim 8, wherein the preset world model is obtained by scaling the preset compression model.

11. The electronic device according to claim 7, wherein the on-vehicle lenses are fisheye lenses, and wherein said constructing the coordinate mapping table comprises:

performing distortion correction on the original images.

12. The electronic device according to claim 7, wherein coordinate data have a double-precision floating-point format.

13. A non-transitory computer-readable storage medium storing computer programs, wherein the computer programs, when executed by a processor, cause the processor to:
- construct a coordinate mapping table, the coordinate mapping table representing a coordinate mapping relationship between a first panoramic image generated by splicing first original images captured by a plurality of on-vehicle lenses and each of the first original images captured by the plurality of on-vehicle lenses;
- generate a second panoramic image based on second original images captured by the plurality of on-vehicle lenses and the coordinate mapping table;
- map the second panoramic image to a preset world model in such a manner that a virtual world is constructed inside the preset world model;
- dispose a vehicle model at a position, corresponding to a real vehicle, in the virtual world; and
- render and output an image, corresponding to a specified view point, in the virtual world, the specified view point being located on the preset world model and facing towards a center of the vehicle model.

14. The non-transitory computer-readable storage medium according to claim 13, wherein said constructing the coordinate mapping table comprises:
- splicing the first original images captured by the plurality of on-vehicle lenses to obtain an initial panoramic image;
- determining an image outside a circular image with a center of the real vehicle as a center of a circle and a preset length as a radius in the initial panoramic image, as a to-be-compressed image;
- constructing a preset compression model comprising a center of a sphere;
- mapping the to-be-compressed image to the preset compression model by taking the center of the sphere as a view point;
- projecting, by pulling the view point to infinity, the to-be-compressed image mapped to the preset compression model, to a plane of the circular image to generate a compressed panoramic image, as the first panoramic image; and
- constructing the coordinate mapping relationship based on the compressed panoramic image and the first original images captured by the plurality of on-vehicle lenses, and wherein said constructing the preset compression model comprises:
- determining two first points of intersection of an auxiliary line and the initial panoramic image, wherein the auxiliary line is parallel to a side of the initial panoramic image and passes through the center of the circle;
- determining a target point, wherein a connecting line between the center of the circle and the target point is perpendicular to the initial panoramic image, and the target point forms a preset angle with each of the two first points of intersection;
- determining a target distance from the target point to a second point of intersection of the auxiliary line and the circular image; and
- determining a closed structure as the preset compression model, wherein the closed structure is located at a side of the circular image facing towards the target point and is formed by a sphere with the target point as a center of sphere and the target distance as a radius.

15. The non-transitory computer-readable storage medium according to claim 14, wherein said splicing the first original images captured by the plurality of on-vehicle lenses to obtain the initial panoramic image comprises:
- cropping a region of interest (ROI) of each of the first original images;
- performing projection transformation on the cropped ROIs of the first original images to generate top views; and
- splicing the top views corresponding to the plurality of on-vehicle lenses to generate the initial panoramic image.

16. The non-transitory computer-readable storage medium according to claim 14, wherein the preset world model is obtained by scaling the preset compression model.

17. The non-transitory computer-readable storage medium according to claim 13, wherein the on-vehicle lenses are fisheye lenses, and
wherein said constructing the coordinate mapping table comprises:
- performing distortion correction on the original images.

18. The non-transitory computer-readable storage medium according to claim 13, wherein coordinate data have a double-precision floating-point format.

* * * * *